United States Patent [19]

Musgrave

[11] 4,397,108

[45] * Aug. 9, 1983

[54] INTERACTING SPRING ASSEMBLY

[76] Inventor: Daniel D. Musgrave, 8201 Caraway St., Cabin John, Md. 20818

[*] Notice: The portion of the term of this patent subsequent to Feb. 24, 1998, has been disclaimed.

[21] Appl. No.: 225,605

[22] Filed: Jan. 16, 1981

Related U.S. Application Data

[63] Continuation-in-part of Ser. No. 3,664, Jan. 15, 1979, Pat. No. 4,258,495.

[51] Int. Cl.³ .......................... F41C 25/02; F16F 1/22
[52] U.S. Cl. ........................................ 42/50; 267/165
[58] Field of Search ................... 42/50; 267/165, 164, 267/158

[56] References Cited

U.S. PATENT DOCUMENTS

| | | | |
|---|---|---|---|
| 3,039,221 | 6/1962 | Musgrave | 42/50 |
| 3,964,199 | 6/1976 | Musgrave | 42/50 |
| 3,999,319 | 12/1976 | Musgrave | 42/50 |
| 4,205,474 | 6/1980 | Musgrave | 42/50 |
| 4,252,302 | 2/1981 | Musgrave | 42/50 |
| 4,258,494 | 3/1981 | Musgrave | 42/50 |
| 4,291,480 | 9/1981 | Musgrave | 42/50 |

Primary Examiner—Charles T. Jordan

[57] ABSTRACT

Springs adapted for assembly in a limited space, in a minimum-stress condition. When thrust is desired, the relationship among springs in the assembly is changed, resulting in a tendency for the assembly to expand in a predetermined direction.

26 Claims, 31 Drawing Figures

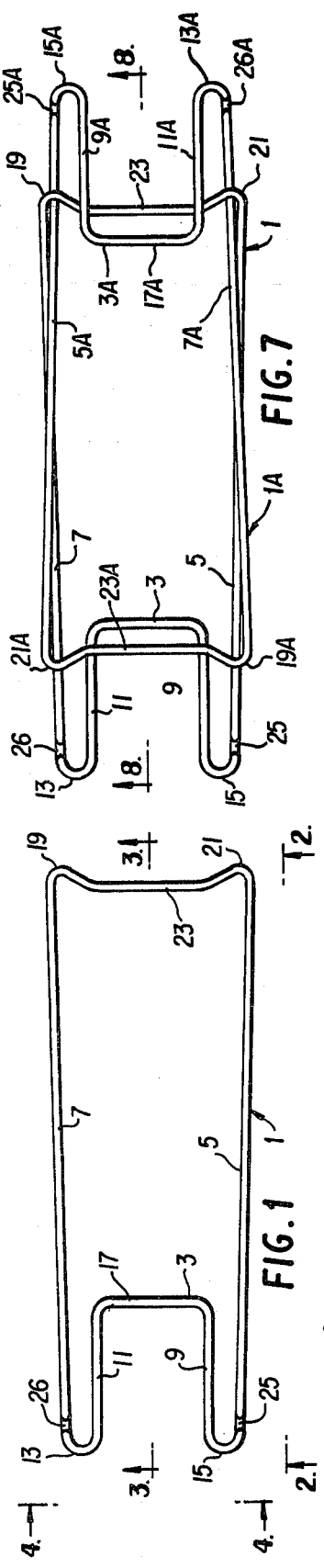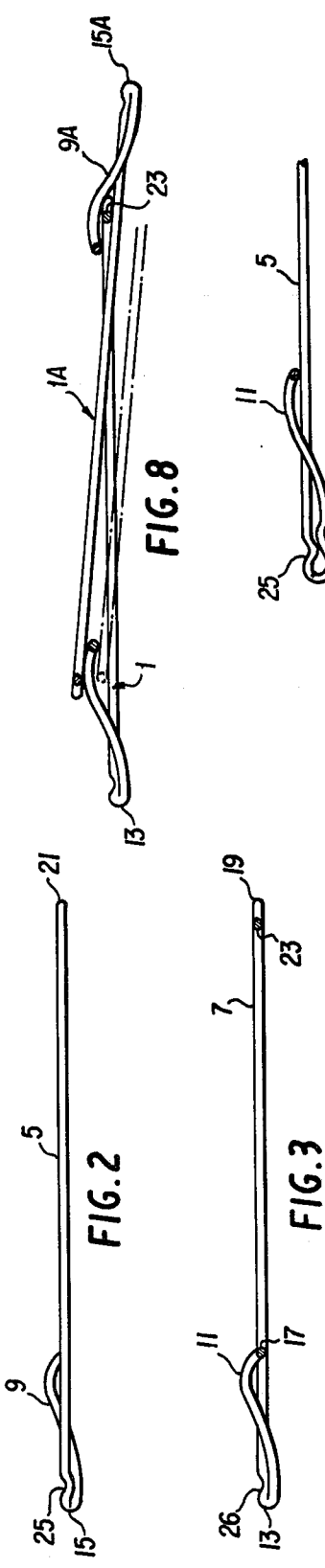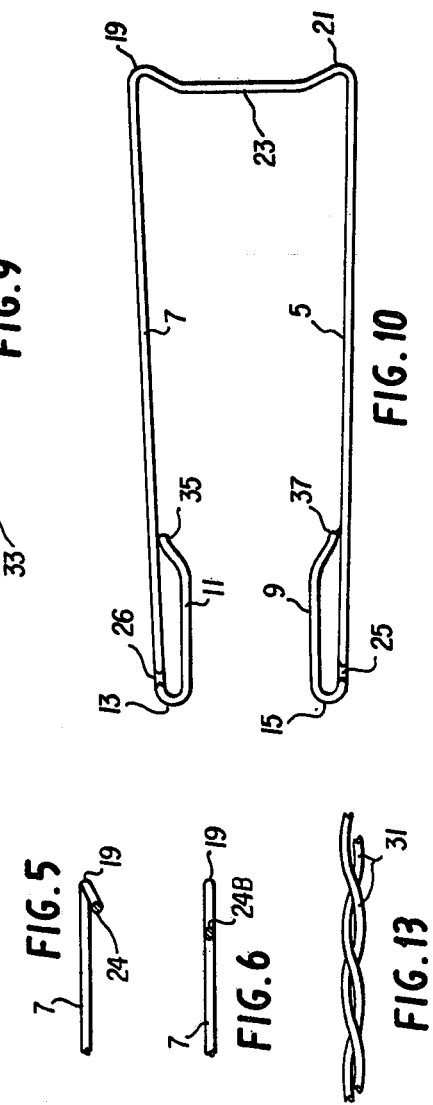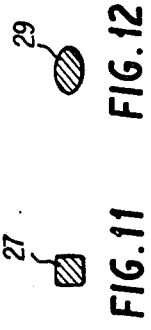

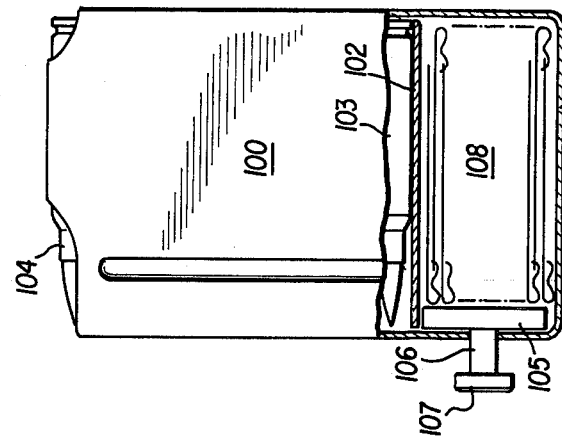
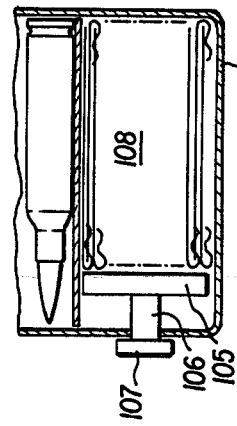
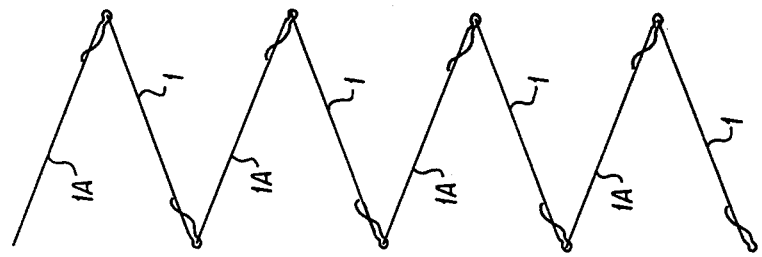
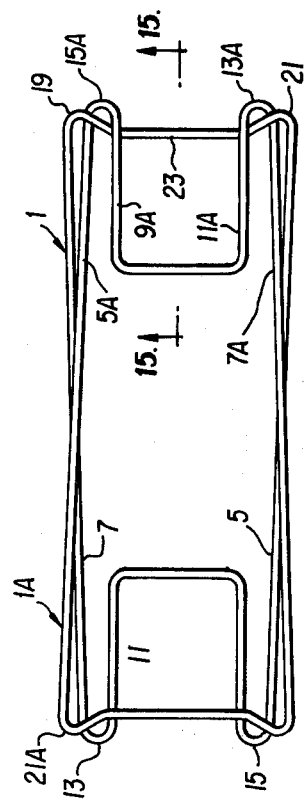
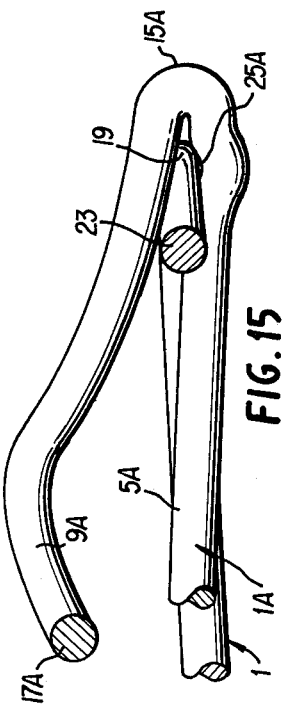
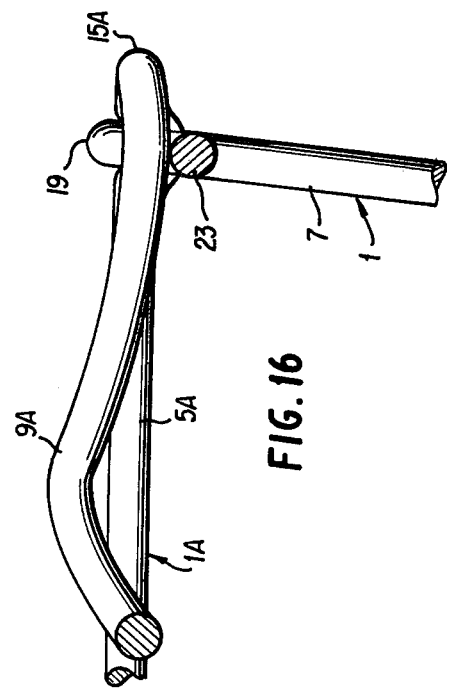

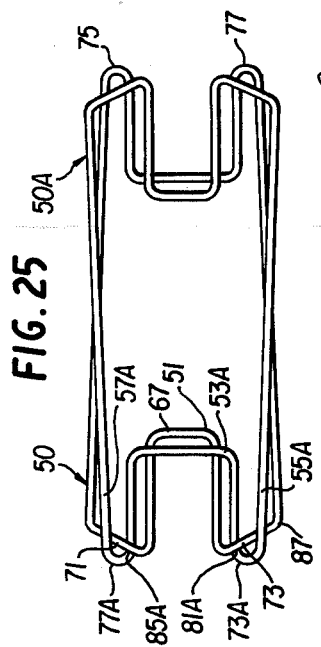
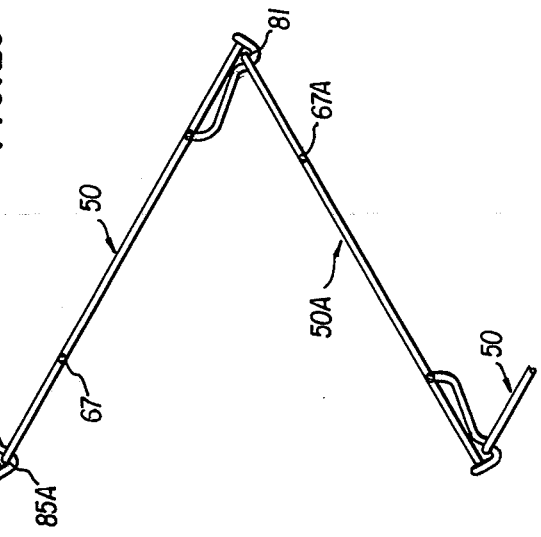
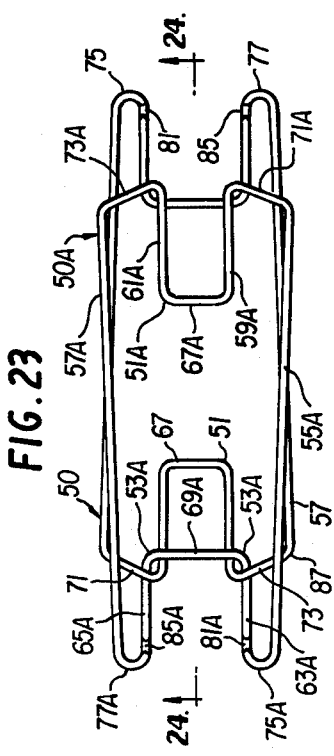
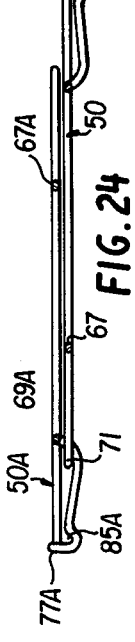
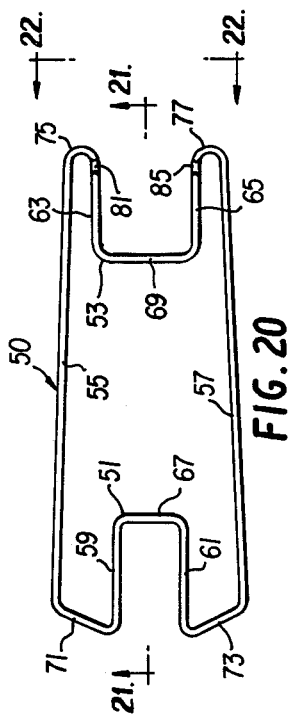
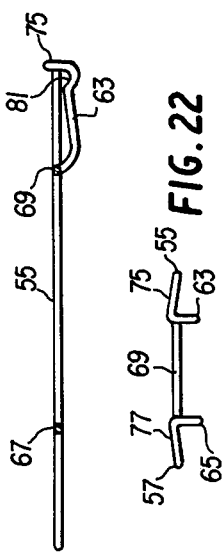

INTERACTING SPRING ASSEMBLY

This application is a continuation-in-part of application Ser. No. 3664 filed Jan. 15, 1979 and entitled INTERACTING SPRINGS, now U.S. Pat. No. 4,258,495.

Many types of mechanical equipment include springs which must stand by in a stressed condition for long periods of time. An obvious limitation on such springs is the possibility that resilience may be lost, thus rendering the mechanism inoperable.

An example of this problem is found in the ordinary cartridge magazine for firearms. For military use it would be desirable to fill the magazine with cartridges at a factory and issue it to the user in a protective wrapper. This cannot be done because of the limitation of time for keeping the magazine spring stressed. As a result, magazines and ammunition must be stored, shipped, and issued separately, an inefficient and inconvenient procedure.

The principal object of this invention is to provide springs which can be installed in a minimum space, while in a minimal-stressed condition, and can be adjusted within the same space to a highly-stressed condition.

Another object of this invention is to provide such springs which will be economical to fabricate.

These and other objects of the present invention will become apparent upon reference to the following specification, taken in connection with the accompanying drawings, wherein:

FIG. 1 is a top view of a loop spring.

FIG. 2 is a side elevation of the spring shown in FIG. 1. The side which is viewed is indicated by arrows numbered 2 on FIG. 1.

FIG. 3 is a section of the same spring, taken in the plane 3—3 on FIG. 1.

FIG. 4 is an end view of the spring shown in FIG. 1. The end which is viewed is indicated by arrows numbered 4 on FIG. 1.

FIG. 5 is an alternate construction for a portion of FIG. 3.

FIG. 6 is another alternate construction for a portion of FIG. 3.

FIG. 7 is a top view of two loop springs like that shown in FIG. 1 and assembled together.

FIG. 8 is a section of the same springs, taken in the plane 8—8 on FIG. 7.

FIG. 9 is an enlarged detail of a portion of the spring shown in FIG. 3.

FIG. 10 shows an alternate construction for the loop spring disclosed in FIG. 1.

FIG. 11 shows a cross-section of square wire.

FIG. 12 shows a cross-section of formed wire.

FIG. 13 shows a view of braided wire.

FIG. 14 is similar to FIG. 7 but the loop springs have been moved relative to each other.

FIG. 15 is a partial sectional view taken in the plane indicated by arrows 15—15 on FIG. 14.

FIG. 16 is similar to FIG. 15 but the parts shown have been pivoted apart.

FIG. 17 is generally schematic and shows how an interacting spring assembly can be installed in a cartridge magazine while in a relaxed condition.

FIG. 18 shows how an assembly installed as in FIG. 17 can be stressed.

FIG. 19 is schematic, and shows how a plurality of members in an interacting spring assembly can expand the assembly, when stressed.

FIG. 20 is a top view of an alternate construction of a loop spring, which embodies the present invention.

FIG. 21 is a sectional view taken in the plane indicated by arrows 21—21 on FIG. 20.

FIG. 22 is an end view of the loop shown in FIG. 20. The end which is viewed is indicated by arrows 22—22 on FIG. 20.

FIG. 23 shows two loop springs of the type disclosed in FIG. 20, and assembled together.

FIG. 24 is a sectional view taken in the plane indicated by arrows 24—24 on FIG. 23.

FIG. 25 is similar to FIG. 23 but the loop springs have been moved relative to each other.

FIG. 26 is a sectional view of a plurality of springs such as those in FIG. 25, showing how an assembly of such springs will tend to expand when stressed.

Figure 27:
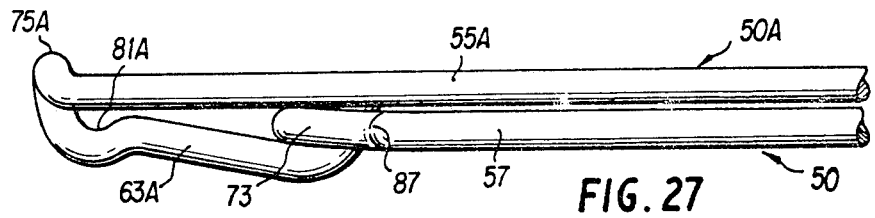
FIG. 27 is a partial elevation, showing the left portion of the assembly disclosed in FIG. 23.

The drawings have been prepared for the purpose of disclosing the invention, and they do not show any particular cartridge magazine. In actual practice, this invention can be applied to various types of magazines and to other types of equipment. The drawings are exemplary, and they should not be construed as limitations on the scope of the invention. For clarity of disclosure, the drawings have been prepared in simplified form. The various distortions caused by stresses in the springs are therefore shown only to the extent necessary for disclosure.

Referring to the drawings in detail, FIG. 1 shows a loop spring 1 which is made substantially in the form of a quadrilateral having an inset portion 3 in one end thereof. Loop spring 1 also has two sides 5 and 7. Inset portion 3 has sides 9 and 11 each of which is joined to a side of the loop by one of the short end portions of the loop. As disclosed in FIG. 1 end portion 13 joins sides 7 and 11, while end portion 15 joins sides 5 and 9. Inset portion 3 is completed by bridge 17 which connects sides 9 and 11. For convenience, the loop spring may now be referred to merely as the loop.

On the end of the loop opposite from the inset portion, crank means is formed. The crank means comprises fulcrums 19 and 21 and at least one throw 23. The fulcrums and the throw are connected and constitute one end of the loop. Fulcrum 19 is connected to side 7 while fulcrum 21 is connected to side 5. As disclosed in FIG. 1 the several connected parts form a loop which is endless and is symetrical about a longitudinal axis.

Although the loop is formed substantially in one main plane, the inset portion is bent somewhat out of that plane as may be seen in FIG. 2. While FIG. 3 shows crank throw 23 positioned in the said main plane of the loop it can also be bent somewhat out of said plane, as will be explained hereinafter.

Shown in FIG. 1 and FIG. 2 is a detent 25 formed on side 5. A similar detent 26, formed on side 7, is disclosed in FIG. 1 and FIG. 3. The purpose of the detents will be explained later.

Crank throw 23 appears partly sectioned, in FIG. 3. FIG. 5 is an alternate detail for the right portion of FIG. 3. In FIG. 5 crank throw 24 does not lie in the same plane as side 7. The purpose of this alternate will be explained later.

Another alternate is shown in FIG. 6. The distance which crank throw 24B is offset from the end of the loop is more in this instance than what is disclosed in FIG. 3. The purpose of this alternate will be explained later.

FIG. 4 is an end view of the loop which discloses the inclination of end portions 13 and 15. The inclination shown was selected merely for purpose of disclosure. In actual practice it may be greater or lesser, depending upon circumstances. The purpose of the inclination will be explained later.

The loop can be made of wire or any other suitable material. The wire may have a circular cross-section or a rectangular cross-section such as wire 27 in FIG. 11.

Any of the well-known types of formed wire can also be used to form the loop. An example is shown in FIG. 12, where wire 29 has an elliptical cross-section.

The loop can also be made of plural, braided, wire. An example of a portion of such braided wire is shown at 31 in FIG. 13.

FIG. 9 shows an alternate detail for the left portion of FIG. 3. An additional detent 33 is formed on side 11 of the inset portion of the loop. Obviously a similar detent could be provided on side 9. The purpose of the additional detents will be explained later.

It is not necessary that the loop be endless. FIG. 10 shows an alternate construction in which bridge 17 is eliminated. End 35 of side 11 is bent to a convenient position near side 7. Similarly, end 37 of side 9 is bent to a position near side 5. Other details are similar to those shown in FIG. 1.

In FIG. 7 two loops of the type disclosed in FIG. 1 have been assembled together. To distinguish between the two loops, one is numbered 1 and is oriented similarly to loop 1 in FIG. 1. The other is numbered 1A and is oriented oppositely to loop 1 in FIG. 1.

Parts 3A, 5A, 7A, 9A, 11A, 13A, 15A, 17A, 19A, 21A, 23A, 25A, and 26A, of loop 1A correspond to parts 3, 5, 7, 9, 11, 13, 15, 17, 19, 21, 23, 25, and 26, respectively, of loop 1.

In FIG. 7 and FIG. 8, loop 1A is in mechanical engagement with loop 1. Fulcrum 19 is resting against side 5A while fulcrum 21 is resting against side 7A. At the same time sides 9A and 11A are exerting a retaining force against crank throw 23. The magnitude of the retaining force will be determined by the configuration of the several parts thus engaged. In the manufacture of the loops the said configuration can be so chosen that there will be no force tending to turn the crank when the loops are assembled as shown in FIG. 7 and FIG. 8. If desired, the said configuration could also be chosen so that some turning force will be exerted on the crank. Advantages of each choice will be explained later.

Depending upon said choice, the engagement of loops 1 and 1A illustrated in FIG. 7 can be termed the no-stress, or the low-stress, engagement.

On the other hand FIG. 14 discloses the same two loops in what can be termed high-stress engagement. The change from one type of engagement to the other is accomplished in a simple manner by sliding one loop relative to the other so that their respective ends are substantially flush. This is in contrast to the relationship disclosed in FIG. 7 where the said ends are staggered.

As the loops move, inter se, to the said high-stress engagement, curved sides 9A and 11A of the inset portion of loop 1A will exert an increasing force on crank throw 23. This will tend to pivot loop 1 away from loop 1A with fulcrums 19 and 21 bearing against sides 5A and 7A of loop 1A, respectively. This arrangement of the fulcrums permits a free hinging action.

FIG. 15 shows a partial longitudinal section of the two loops as engaged in FIG. 14. But it is important to understand that complex curves would appear in the loops when thus stressed, in actual practice. In FIG. 15 it is to be assumed that the assembled loops are prevented from pivoting apart because of some mechanical restraint, which is not shown on the drawing.

FIG. 15 shows the high-stress relationship of loops 1 and 1A in some detail. During movement to the stressed condition, crank throw 23 has cammed side 9A away from side 5A thus causing a torsional stress in end 15A. At the same time fulcrum 19 is resting in notch 25A of loop 1A. FIG. 15, being a sectional view, shows only those elements positioned in the direction of the view. The loops being symetrical, there is another, similar group of elements, in the same condition, on the opposite side of the assembly. As the two groups of elements are alike in functioning, it is unnecessary to repeat the explanation for the second group.

In FIG. 15 the torsional stress in end 15A causes side 9A to exert a downward force on crank throw 23. The same torsional stress causes notch 25A to exert an upward thrust on fulcrum 19. If the assumed mechanical restraint is removed, the loops will pivot apart as shown in FIG. 16, where side 9A has force crank throw 23 to revolve approximately a quarter of a revolution around fulcrum 19. This movement has somewhat relieved the stress in end 15A. It should be reiterated that the drawings are for the purpose of disclosure, and that they are therefore somewhat simplified in detail.

FIG. 16 differs from FIG. 15 in that there is no assumed restraint preventing the loops from pivoting apart, and they have therefore pivoted. The maximum angle to which the loops will pivot when there is zero restraint is determined mostly by the angle of the crank relative to the main plane of the loop. An angle of 90° of pivoting is theoretically possible.

Design considerations in particular cases may require that the crank be set at an angle with the loop as shown in FIG. 5. Such considerations may also determine the length of the throw of the crank. In FIG. 6 the throw was deliberately shown exagerated, to establish the fact that this dimension can be varied. To meet engineering requirements, a considerable variation is possible in the angle, and the throw, of the crank.

FIG. 19 is a view showing how several loops 1 and 1A can be assembled into a stack. If the assembled loops are stressed, as in FIGS. 14, 15, and 16 the stack will tend to expand, somewhat as shown in FIG. 19. The included angle between the loops will depend on structural details, such as the angle between the crank and the main plane of the loop. The angle can be selected to meet design requirements, as already stated.

The dimension of the throw of the crank may also have some effect on the included angle, because of increased flexibility of a crank with a greater throw. Obviously, of two different cranks made of the same material, that with the longer throw will flex more readily.

In FIG. 19 it should be assumed that the assembly has expanded against a load. This should be contrasted with FIG. 16, where the loops are shown at their maximum angular cranked separation, which implies no significant load. Of course, the torque exerted by the crank will decrease rapidly as it approaches the maximum of its angular movement, that is, as it approaches dead center.

The magnitude of the said torque will be determined to some extent by the inclination of end portions such as 13 and 15, as shown in FIG. 4. Obviously the said inclination can be varied to meet design considerations, that is to say, the torque can be increased or decreased by varying the inclination.

To a limited extent, the distance between sides 5 and 9, and between sides 7 and 11 will also affect the said torque, because the said distances determine the dimensions of ends 15 and 13, respectively. Of course, the flexibility of the curved ends is affected somewhat by their dimensions.

As stated earlier, loops assembled as shown in FIG. 7 and FIG. 8 may be either in a low-stress or a no-stress condition. The same loops assembled as shown in FIG. 14 and FIG. 15 are in a high-stress condition, which would be the normal operating condition. The choice of the no-stress or the low-stress condition as the inactive state will depend upon design requirements. The no-stress condition will permit virtually unlimited standby spring life, but it will require a relatively large amount of work to activate the assembly. The low-stress condition will require less work to activate the assembly but of course resilience might be affected during long term storage. The word work as used above is intended to mean the force exerted multiplied by the distance through which the force moves to activate the assembly.

The integrity of the stack of assembled loops during such movement is assured by guides and stops.

In FIG. 14 it can be seen that the sides of the loops can act as guides during the said movement. In the vicinity of fulcrum 19, side 7 guides side 5A while in the vicinity of fulcrum 21, side 5 guides 7A. When the movement is complete, the sides prevent relative displacement of the loops in either direction along the axis of crank 23.

It can also be seen in FIG. 14 and FIG. 15 that end portions such as 13A and 15A serve as stops to limit movement of the loops, inter se.

Detents such as 25, 26, 25A, and 26A are needed to maintain the loops in high-stress engagement. Without the detents the loops might tend to slide, inter se, toward the low-stress, or no-stress condition. The detents are shown as notches but obviously other configurations might be used. They might also be plural as shown in FIG. 9, which is an alternate for the left side of FIG. 3. In addition to detent 25 which is adapted to engage a fulcrum such as 19A in FIG. 7, a second detent 33 is provided. It is adapted to engage a crank throw such as 23A in FIG. 7. Other detent arrangements can be employed to provide sufficient detents to resist any tendency of the loops to slide out of high-stress engagement.

Another embodiment of the present invention is disclosed in FIGS. 20 to 29. FIG. 20 shows a loop spring 50 which is made substantially in the form of a quadrilateral, with inset portions 51 and 53 in the ends thereof. The long sides of the loop are numbered 55, and 57, respectively.

Inset portion 51 has sides 59 and 61, while inset portion 53 has sides 63 and 65.

Sides 59 and 61 are connected by bridge 67. Sides 63 and 65 are similarly connected by bridge 69.

Sides 55 and 59 are connected by crank portion 71; similarly sides 57 and 61 are connected by crank portion 73.

Sides 55 and 63 are connected by end portion 75; similarly sides 57 and 65 are connected by end portion 77.

The parts thus far described form a closed loop which lies substantially in one main plane, which plane is defined mostly by sides 55 and 57. However, by reference to FIG. 21 it can be seen that side 63 of inset portion 53 is bent somewhat out of the said plane. Side 65, though not shown in FIG. 21, has a profile similar to side 63. Notch 81, formed in side 63 can be seen in FIG. 20 and FIG. 21. Corresponding notch 85 in side 65 can be seen in FIG. 20.

In FIG. 23, two loops of the type disclosed in FIG. 20 have been assembled together. To distinguish between the two loops, one is numbered 50 and is oriented similarly to loop 50 in FIG. 20. The other is numbered 50A and is oriented oppositely to loop 50 in FIG. 20.

Parts 51A, 53A, 55A, 57A, 59A, 61A, 63A, 65A, 67A, 69A, 71A, 73A, 75A, 77A, 81A, and 85A, of loop 50A correspond to parts 51, 53, 55, 57, 59, 61, 63, 65, 67, 69, 71, 73, 75, 77, 81, and 85, respectively, of loop 50.

The assembled relationship of loops 50 and 50A can be understood by comparing FIG. 23 with FIG. 24, which is a longitudinal section of FIG. 23. Crank portion 71 of loop 50 is engaged between sides 57A and 65A of loop 50A. The parts may be so configured that when thus assembled there will be no force tending to turn the crank, or they may be so configured that there is a limited force tending to turn the crank. Depending upon the force thus exerted, the engagement illustrated in FIG. 23 and FIG. 24 can be termed the no-stress, or the low-stress, engagement. It will be noted that the ends of the loops are staggered when so engaged.

The statements in the previous paragraph apply also to crank portion 73 and sides 55A and 63A with the exception that these parts are opposite hand when compared to 71, 57A, and 65A.

On the other hand, FIG. 25 discloses the two loops in what can be termed high-stress engagement. The change from one type of engagement to the other has been accomplished in a simple manner by sliding one loop relative to the other so that their respective ends are substantially flush.

As the loops move, inter se, to the said high-stress engagement, side 57A will exert a downward torque against crank portion 71 which becomes engaged in, and is supported by, notch 85A; at the same time side 55A will exert a downward torque on crank portion 73 which becomes engaged in, and is supported by, notch 81A.

(The above term downward means away from the viewer in FIG. 25 or toward the bottom of the drawing in FIG. 26.)

The result of the torque on the crank portions will be a tendency for the assembly of loops to expand somewhat as shown in FIG. 26. It is readily apparent that the torque can be predetermined by varying the configuration of the parts. For example, the inclination of end portions 75 and 77 as disclosed in FIG. 22, has considerable influence on the magnitude of said torque.

Figure 28:
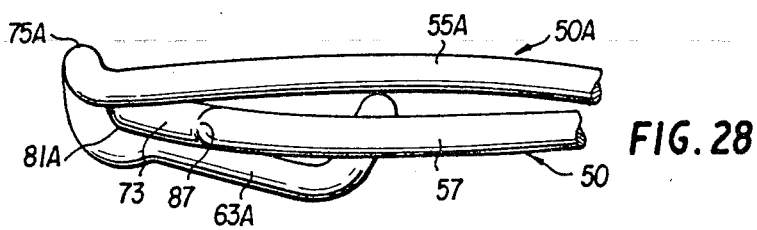
FIG. 28 is a partial elevation, showing the left portion of the assembly disclosed in FIG. 25.
Figure 29:
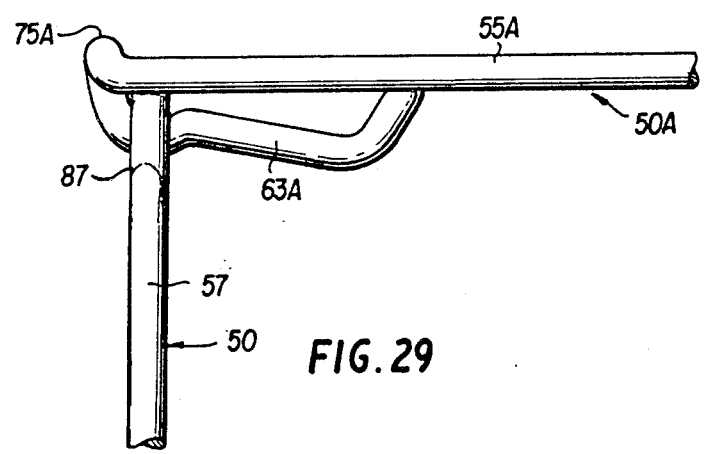
FIG. 29 is similar to FIG. 28, but one part has been moved.

The action of the crank is shown more distinctly in FIGS. 27, 28, and 29.

FIG. 27 is a partial elevation of the left portion of the assembly disclosed in FIG. 23. To clarify FIGS. 27, 28, and 29 the corner between crank portion 73 and side 57 of loop 50 is numbered 87. The corner is also identified in FIGS. 23 and 25. Its relative position and orientation in the several views is helpful in understanding the crank action.

In FIG. 27, the assembly is either in the low-stress, or the no-stress, condition. Crank portion 73 is engaged under side 55A and over side 63A near the inner end of side 63A within the loop. There is either little or no tendency for loops 50 and 50A to pivot apart.

In FIG. 28, loops 50 and 50A have been moved, inter se, so that their ends are substantially flush. Crank portion 73 has become engaged in notch 81A and in moving between side 55A and 63A has spread these sides apart. This causes a torsional stress in end portion 75A and bending of sides 55A and 57. For purposes of disclosure it will be assumed that some mechanical restraint is preventing loops 50 and 50A from pivoting apart in FIG. 28. Of Course the bends caused by the stresses are depicted in simplified form for purposes of disclosure.

In FIG. 29, the assumed mechanical restraint has been removed and the torsional stress in end 75A has caused side 55A to exert a downward force on crank portion 73. At the same time the crank portion is supported in notch 81A. The resultant of the several forces on the crank portion is a tendency to revolve about the notch. This is what has happened in FIG. 29, with the result that loop 50 has pivoted substantially 90° relative to loop 50A. This relative movement has relieved the stress in the several parts.

From the above description it is readily apparent how an assembly such as that disclosed in FIG. 24 can be caused to expand to the condition shown in FIG. 26, when thrust is required.

FIG. 17 shows how the assembly can be installed in a magazine having a casing 100, a floor 101, a follower 102, and a pusher block 105. The block has a neck 106 extending through a suitable opening in the casing and terminating in a head 107. A cartridge 103 rests on the follower and another cartridge 104 is visible at the top of the magazine. Between the two visible cartridges is a column of cartridges, not visible. Installed in the space between the follower and the floor is an interacting spring assembly 108, which is substantially similar to that disclosed in FIG. 24.

In FIG. 17, the interacting spring assembly is in either the low-stress or the no-stress condition, with the ends of the loops staggered.

In FIG. 18, which shows only the lower part of the magazine illustrated in FIG. 17, the block has been pushed into the casing. The spring assembly has thereby been activated because the ends of the loops are not substantially flush. As explained elsewhere in this application, the assembly tends to expand when the loop ends are flush. The assembly thus acts against the follower to push the cartridges toward the feeding position occupied by cartridge 104. The assembly reacts against floor 101.

By their protusion from the casing, neck 106 and head 107 can serve as an indicator of the status of the spring assembly. Even in darkness it will be possible to touch the head and neck to determine if the magazine is ready for use. When not ready for use, the spring assembly will be in the low-stress or the no-stress condition.

By comparison of FIG. 23 and FIG. 25 it can be noted that during movement of the loops, inter se, inset portion 51 of loop 50 is guided by inset portion 53A of loop 50A. This insures integrity of the stack. The movement is limited to a predetermined extent because the crank portions of one loop will contact the end portions of another loop, when the predetermined distance has been traveled.

Figure 30:
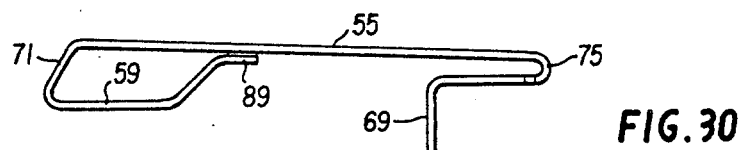
FIG. 30 is similar to FIG. 20, but with alternate details of construction.

FIG. 30 is an alternate for FIG. 20, to show how the loop can be made with ends. Bridge 67 is eliminated and end 89 is bent to a convenient position near side 55. Similarly end 91 is bent to a convenient position near side 57. The bridge is not needed for functioning and the loops can be assembled by springing the ends slightly.

Figure 31:
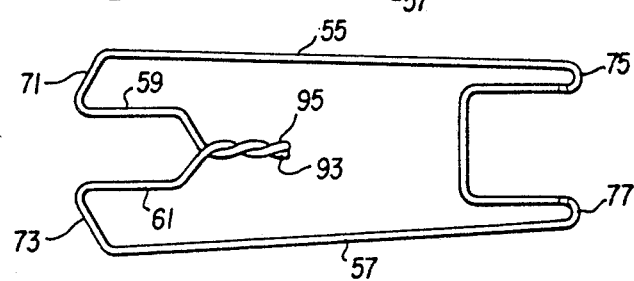
FIG. 31 is also similar to FIG. 20, but shows different alternate details of construction.

FIG. 31 is another alternate for FIG. 20. The bridge is eliminated and ends 93 and 95 of the loop are twisted together. The twisted portion may be flattened. As the bridge is not needed for functioning, this permits a somewhat cheaper construction.

In reading the specification is should be understood that interaction between the loops is mutual. Two adjacent loops may therefore be considered as providing fulcrums for each other. In a similar sense, when two loops are in high-stress engagement, either may be considered as providing the detent means to retain both in engagement.

The disclosed embodiments of the present invention, including alternate details of construction shown, are not the only embodiments considered feasible for practical employment. It is therefore considered desirable to select a broad term which could include the disclosed elements, such as full or partial loops, and equivalents which can be substituted for them. The word member has been selected as being a suitable broad term for describing the basic part which enters into an interacting spring assembly of the type disclosed hereinbefore.

It will be noted that the disclosed members are adapted for nesting closely when assembled and that they are also adapted to flex when moving inter se. To facilitate assembly, the members may be magnetized.

I claim:

1. A member adapted for installation in an interacting spring assembly, said member including: a substantially rectangular resilient loop having crank means formed on an end thereof; said loop also having a return portion inset into an end thereof; and a side of said loop joined with a side of said return portion comprising torsional actuation means adapted for cooperation with crank means on an other loop, said other loop being identical with said resilient loop.

2. A member as set forth in claim 1, and made of wire.

3. A member as set forth in claim 2 wherein said wire has a square cross section.

4. A member as set forth in claim 2 wherein said wire is braided.

5. A member as set forth in claim 2 wherein said wire is endless.

6. A member as set forth in claim 3 wherein said wire has at least two ends.

7. A member as set forth in claim 1, and coated with a lubricant.

8. A member as set forth in claim 1, and magnetized.

9. A member as set forth in claim 1, said member being symetrical about at least one axis.

10. A member as set forth in claim 1, said member being formed substantially in one plane.

11. A member as set forth in claim 1 wherein said substantially rectangular resilient loop and said crank means lie substantially in the same plane.

12. A member as set forth in claim 1 wherein said substantially rectangular resilient loop and said crank means do not lie substantially in the same plane.

13. A member as set forth in claim 1 wherein at least one side of said substantially rectangular resilient loop is adapted to serve as a lever.

14. A member as set forth in claim 1 wherein a portion of said substantially rectangular resilient loop is adapted to serve as a fulcrum.

15. A member as set forth in claim 1 wherein said substantially rectangular resilient loop includes detent means adapted to engage an other loop, said other loop being identical with said resilient loop.

16. A member as set forth in claim 1 wherein said substantially rectangular resilient loop includes guide means adapted to control movement of an other loop, said other loop being identical with said resilient loop.

17. An interacting spring assembly comprising: a plurality of resilient members arranged for pivotable engagement in a first compact zigzag relationship in which said members are substantially relaxed; said members being movable inter se while continuing said engagement to a second compact zigzag relationship in which torsional means on a first of said members is positionally adapted to exert torque against crank means on a second of said members thereby tending to pivot said first and said second members apart; and each member of said plurality including detent means positionally adapted to retain said member in said second relationship.

18. An interacting spring assembly comprising: a plurality of resilient members arranged for pivotable engagment in a first compact zigzag relationship in which torsional means on a first of said members is positionally adapted to exert a predetermined torque against crank means on a second of said members thereby causing a predetermined tendency to pivot said first and said second members apart; said members being moveable inter se while continuing said engagement to a second compact zigzag relationship in which said torsional means is positionally adapted to exert a torque against said crank means greater than said predetermined torque, thereby causing a tendency to pivot said first and said second members apart which is greater than said predetermined tendency; and each member of said plurality including detent means positionally adapted to retain said member in said second relationship.

19. An assembly as set forth in claim 17 or claim 18 wherein said members are adapted for nesting while in said first relationship.

20. An assembly as set forth in claim 17 or claim 18 wherein each member in said assembly is oriented oppositely to an adjacent member in said assembly.

21. An assembly as set forth in claim 17 or claim 18 wherein each end of each member in said assembly is staggered relative to a corresponding end of an adjacent member in said assembly.

22. An assembly as set forth in claim 17 or claim 18 wherein each end of each member in said assembly is substantially flush with a corresponding end of an adjacent member in said assembly.

23. An assembly as set forth in claim 17 or claim 18 wherein said members are adapted to flex inter se during movement from said first relationship to said second relationship.

24. An assembly as set forth in claim 17 or claim 18 wherein said members are so engaged as to form a compact integral stack when in said first relationship.

25. A cartridge magazine for a firearm comprising; a casing for storing cartridges having an exit port with at least one lip; floor means affixed to said casing; a follower adapted for pushing a stack of cartridges toward said port, said follower also being adapted to slide in said casing; and an interacting spring assembly installed in said casing so as to engage said floor means and said follower and including; a plurality of resilient members arranged for pivotable engagement in a first compact zigzag relationship in which said members are substantially relaxed; said members being moveable inter se while continuing said engagement to a second compact zigzag relationship in which torsional means on a first of said members is positionally adapted to exert torque against crank means on a second of said members thereby tending to pivot said first and said second members apart; each member of said plurality including detent means positionally adapted to retain said member in said second relationship; and means for moving said members inter se from said first to said second relationship.

26. A cartridge magazine as set forth in claim 25 wherein said means for moving said members is also adapted to serve as a physical indicator outside of said casing to disclose the thrust status of said spring assembly.

* * * * *